United States Patent [19]

Saumell

[11] 4,454,090
[45] Jun. 12, 1984

[54] METHOD OF FORMING THE BRIDGE PORTION IN A FRAME FOR EYEGLASSES

[76] Inventor: Luis E. Saumell, 6318 S.W. 23rd St., Miami, Fla. 33155

[21] Appl. No.: 535,565

[22] Filed: Sep. 26, 1983

[51] Int. Cl.³ .......................... B28B 1/48; B29C 17/08
[52] U.S. Cl. ............................ 264/154; 264/DIG. 30; 264/163; 264/222; 264/227; 425/175
[58] Field of Search ........................ 351/124, 130, 131; 264/219, 220, 222, 223, 227, DIG. 30; 33/22, 23 H, 23 M, 23 R; 409/86; 425/175; 264/154

[56] References Cited

U.S. PATENT DOCUMENTS

| 630,546 | 8/1899 | Kruse | 409/86 |
| 3,701,592 | 10/1972 | Fernandez | 264/222 |
| 4,204,750 | 5/1980 | Hilbert | 264/222 |

Primary Examiner—James B. Lowe
Assistant Examiner—Michael R. McGurk
Attorney, Agent, or Firm—Arthur L. Liberman

[57] ABSTRACT

A method of forming the bridge portion of a conventional eyeglass frame to the exact configuration and dimension of a bridge portion of a predetermined wearer's nose and securing the formed bridge portion to a conventional eyeglass frame. Proper fitting of the formed bridge portion to the wearer's nose is thereby accomplished and slipping of the eyeglasses from the nose is thereby eliminated.

8 Claims, 8 Drawing Figures

METHOD OF FORMING THE BRIDGE PORTION IN A FRAME FOR EYEGLASSES

BACKGROUND OF THE INVENTION

1. Field of the Invention

This invention is directed to a method of accurately and efficiently forming the bridge portion of a frame for eyeglasses to correspond to the configuration and dimension of a predetermined wearer's nose to prevent slipping of glasses down the nose.

2. Description of the Prior Art

Eyeglasses and frames holding such eyeglass pieces have been in use for many years. Such frames include a wide variety of designs but include a common design characteristic. The bridge portion of an eyeglass frame is common to all such conventional frames regardless of their design. The bridge portion serves to at least partially support the eyeglasses as it rests on the bridge portion of the nose of the wearer. The interior surface thereof is curved in somewhat a concave configuration so as to adapt to the outwardly protruding nose bridge of the wearer.

The prior art contains numerous structures and designs intended to overcome the well-known "slipping" problem wherein the bridge portion of the eyeglass frame slips down the length of the nose to a point where vision is obscured or the eyeglass frame literally falls from the nose. The most common occurrence is when the glasses become slightly displaced and, therefore uncomfortable, on a continuous basis. The wearer of the glasses has to therefore constantly readjust by pushing the glass frames back onto the bridge of his nose.

The following U.S. patents are all directed to overcoming such problems by providing or forming such devices to securely grip the bridge portion of the nose by the bridge portion of the glass frame. Such patents include Mastman, U.S. Pat. No. 3,597,053; Fernandez, U.S. Pat. No. 3,701,592; and Hilbert, U.S. Pat. No. 4,204,750.

While the disclosures of the above-noted patents relate to generally optical devices and/or methods of forming such devices, there still is a need in the optical industry for a precisely dimensioned and configured bridge portion for eyeglass frames which will accurately fit the bridge of the nose of the wearer.

SUMMARY OF THE INVENTION

The present invention is directed to a method of forming the bridge portion of eyeglass frames in a manner which exactly corresponds to the dimensions and configurations of the bridge of the nose of the wearer.

More specifically, the method comprises filling a first mold component with a hardening gel or plastic material such as the type of dental material used to make impressions for dentures and the like. This is placed directly on the nose of the wearer generally in the area of the bridge portion of the nose so as to acquire a negative impression of the nose.

From the negative impression, a positive duplicate is formed of hardenable plastic material. This positive duplicate itself may define a second mold component which in turn, after curing, is placed in a mold housing and covered with a metallic material of predetermined hardness. In the preferred embodiment, an aluminum alloy No. 117 is utilized. However, it is recognized that other aluminum alloys or like metallic materials of predetermined hardness may also be utilized.

The result of this interaction is the production of a metallic material negative impression which corresponds to substantially the exact configuration of the bridge of the nose.

The actual formation of the plastic bridge portion used in a conventional eyeglass frame is accomplished by simultaneously tracing the configuration of the metallic material negative impression and shaping a plastic material block. This simultaneous tracing and shaping is accomplished by any of a number of simultaneous engraving or cutting machines which operate by tracing a given configuration or template and simultaneously forming or shaping the same configuration being traced. Such machine may be a Pantoruff Engraving Machine which is primarily used for other operations than described herein. After basic shaping of the plastic material block, the bridge portion of the nose is measured directly and the proper dimension is determined thereby. This dimension is then transferred to the shaped plastic material block and the entire block is cut down to form or define the bridge portion itself.

Subsequently, the formed bridge portion is further configured and shaped to correspond to the particular design of the eyeglass frame involved. The result is an eyeglass frame wherein the bridge portion thereof snugly and accurately fits and corresponds exactly to the configuration of the bridge portion of the nose of the wearer.

BRIEF DESCRIPTION OF THE DRAWINGS

For a fuller understanding of the nature of the present invention, reference is made to the following detailed drawing, in which.

Like numerals refer to like characters throughout the several views of the drawings.

DETAILED DESCRIPTION OF THE PREFERRED EMBODIMENT

Figure 1:
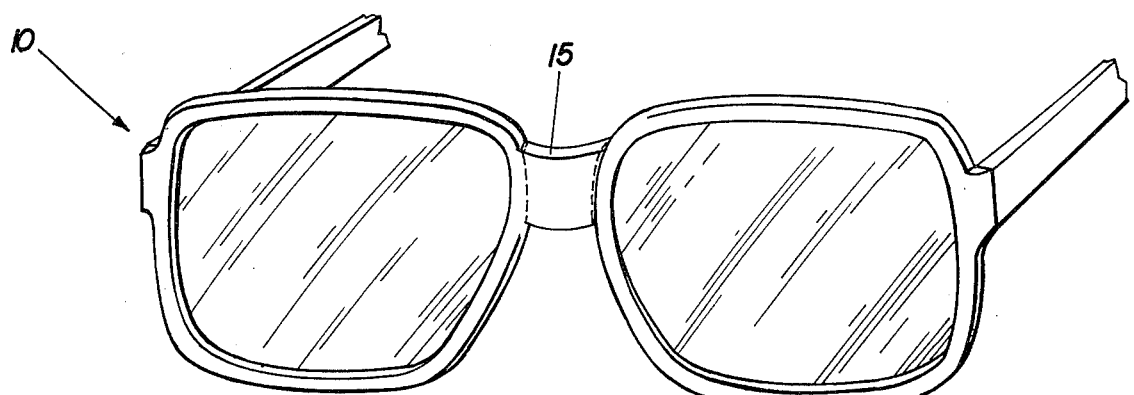
FIG. 1 is an isometric view of a conventional eyeglass frame with the subject bridge portion attached.

As best shown in FIG. 1, the present invention is directed to the formation of a bridge portion 15 designed to be combined with a conventional frame 10 for eyeglasses. More specifically, the bridge portion 15 is formed to have substantially the exact dimension and configuration of the bridge portion of the wearer.

Figure 2:
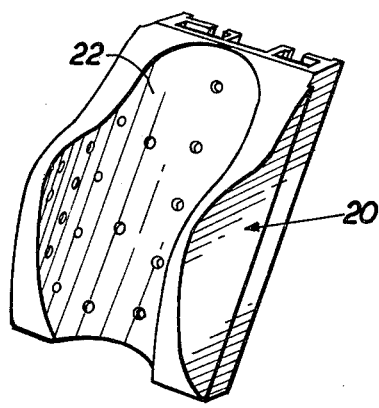
FIG. 2 is an isometric view showing the interior surface features of a first mold component.
Figure 3:
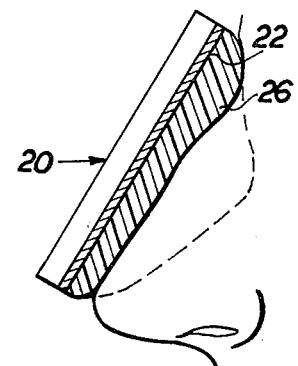
FIG. 3 is a side view in partial section showing the obtaining of a negative impression of the nose of the wearer.

FIG. 2 shows a first mold component 20 having an interior surface 22 of generally concave configuration. This first mold component 20 is used to form a negative impression of the wearer's nose (FIG. 3) by filling the interior 22 with an impressionable and hardenable gel or plastic material 26. When the nose is surrounded by material 26 a negative impression is formed. Once formed and hardened, the first component 20 is placed on the interior of a mold housing 30.

Figure 4:
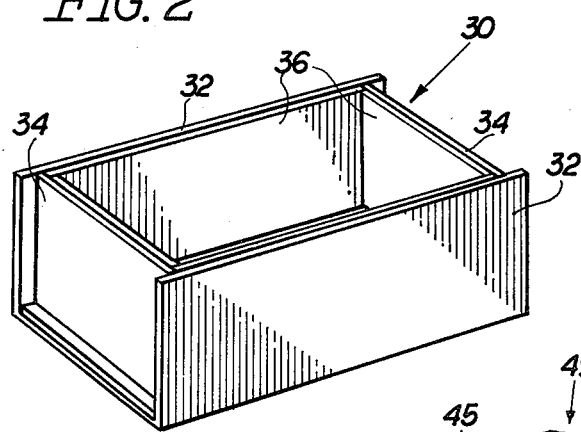
FIG. 4 is an isometric view of a mold housing in which the various components of the mold are placed.
Figure 6:
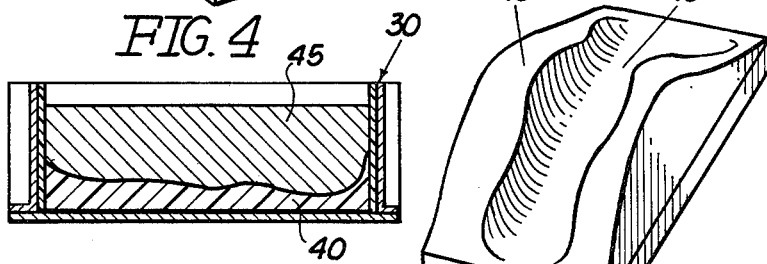
FIG. 6 is a sectional view showing the formation of a metallic material negative impression.
Figure 5:
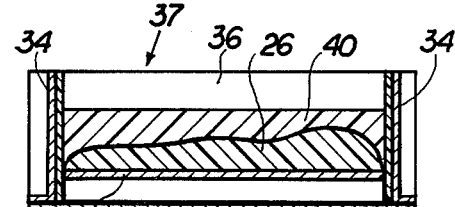
FIG. 5 shows the forming of a positive duplicate of the nose which is defined as a second mold component.

The mold housing 30 as best shown in FIGS. 4, 5 and 6 includes opposite end portions 24 and longitudinal sides 32 defining an interior substantially corresponding to the configuration of the various mold parts to be fitted therein. Lining surfaces 36 may be mounted on the interior walls of the housing 30 so as to prevent sticking and allowing easy removal of the mold parts once formed.

As shown in FIG. 5, the first mold component 20 is placed within the interior of the mold housing 30 and a hardenable plastic material 40 is formed therein to define a second mold component having a base 36. This second mold component is a positive duplicate of the wearer's nose since it was formed directly from the negative obtained through use of the first mold component 20. This is accomplished by the material 40 flowing over the hardened negative impression 26. Once cured, the base and attached positive duplicate 40 defining the second mold component 37 is removed from the mold cavity such that the first mold component 20 may also be removed therefrom.

Figure 7:
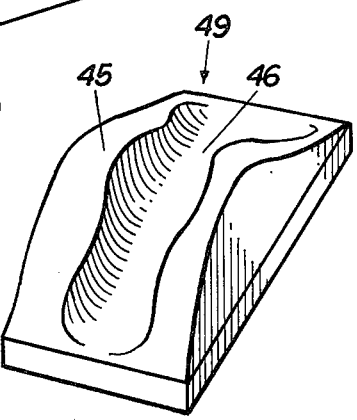
FIG. 7 is an isometric view of the metallic negative impression as referred to with regard to FIG. 6.
Figure 8:
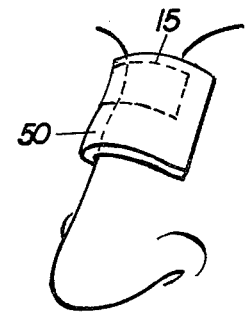
FIG. 8 is the formation of the shaped bridge portion of the nose.

Next, the second mold component 37 is placed back into the mold housing 30 in a face-up position for the purpose of forming a metallic material negative impression generally indicated as 49 in FIG. 7. With reference to FIGS. 6 and 7, the metallic material 45 is poured into the mold housing 30 so as to at least cover the second mold component 37 defining the positive duplicate as at 40. The metallic material is allowed to cure or harden and thereby form a metallic material negative impression 49 wherein the formed recess or cavity 46 also directly corresponds to the outer surface configuration of the nose of the wearer and effectively duplicates the configuration of the negative impression defined by the first mold component 20.

A hardened metallic material is utilized to accomplish detailed tracing of the cavity 46 for the purpose of creating the exact configuration in a plastic material block 50. Therefore, a combined tracing and cutting machine or conventional engraving machine of the type set forth above is utilized to trace the surface configuration of the cavity 46. Accordingly, the interior surface of the plastic material block 50 is also shaped simultaneously to the tracing of the surface cavity 46 and has a substantially exact configuration as the cavity 46. The block 50 is then cut down to produce the bridge portion 15. The amount of cutting is determined by a measurement of the nose of the wearer and particularly the bridge portion thereof and the overall configuration of the design of the glass frame 10. Once completely shaped and configured the bridge portion 15 is then secured to the conventional eyeglass frame 10 and the wearer has a pair of glasses which fits perfectly on the bridge of his nose.

What is claimed is:

1. A method of forming a bridge portion in a frame for eyeglasses having predetermined dimensions substantially corresponding to the bridge of a predetermined nose, said method comprising the steps of:
    (a) obtaining a negative impression of a given wearer's nose substantially at the bridge portion thereof,
    (b) forming a hardened plastic material positive duplicate of the nose from said negative impression,
    (c) forming a metallic material negative from said positive duplicate wherein said metallic material is of a predetermined hardness,
    (d) providing a plastic material frame portion structured and dimensioned for shaping into a bridge portion on a pair of eyeglasses,
    (e) simultaneously tracing the configuration of at least the bridge portion of said metallic material negative and shaping said plastic material frame portion from said tracing in corresponding configuration to that of said tracing, and
    (f) cutting said shaped frame portion into a bridge portion of an eyeglass frame corresponding to the dimension and configuration of the wearer's nose.

2. A method as in claim 1 further comprising the steps of obtaining said negative impression by filling a first mold component with an impressionable, hardening plastic material and placing said first filled mold component directly on the wearer's nose.

3. A method as in claim 2 further comprising the steps of forming said positive duplicate to define a second mold component by positioning said first mold component, subsequent to impression, in a mold housing and filling said mold housing with a hardenable material.

4. A method as in claim 3 further comprising the steps of forming said metallic material negative by positioning said second mold component within said mold housing and covering said second mold component with the metallic material of predetermined hardness.

5. A method as in claim 4 further comprising the steps of utilizing an aluminum alloy of predetermined hardness as said metallic material.

6. A method as in claim 4 further comprising the steps of removing said metallic material negative from said mold housing and subsequent thereto, simultaneously tracing and shaping utilizing a template type duplicating machine.

7. A method as in claim 6 further comprising the steps of measuring the bridge portion of the wearer's nose to determine proper dimensions thereof and cutting said bridge portion of an eyeglass frame in accordance with the acquired dimensions.

8. A method as in claim 7 further comprising the steps of securing said bridge portion to a conventional eyeglass frame.

* * * * *